United States Patent [19]

Russell

[11] E Re. 29,541

[45] Reissued Feb. 21, 1978

[54] HYDRAULIC DRILLING RIG AND POWER SWIVEL

[75] Inventor: Duane K. Russell, Bothell, Wash.

[73] Assignee: Western Gear Corporation, Everett, Wash.

[21] Appl. No.: 742,278

[22] Filed: Nov. 16, 1976

Related U.S. Patent Documents

Reissue of:

[64] Patent No.: 3,949,818
Issued: Apr. 13, 1976
Appl. No.: 510,378
Filed: Sept. 30, 1974

[51] Int. Cl.[2] ..... E21B 19/14

[52] U.S. Cl. ..... 175/52; 166/315; 173/57; 173/164; 175/85; 214/2.5

[58] Field of Search ..... 166/77.5, 315; 173/54, 173/57, 164; 175/52, 57, 85, 122, 203

[56] References Cited

U.S. PATENT DOCUMENTS

| | | | |
|---|---|---|---|
| 2,174,115 | 9/1939 | Auld et al. | 173/164 |
| 2,998,084 | 8/1961 | Johnson et al. | 175/85 |
| 3,005,504 | 10/1961 | Mayhew | 173/57 |
| 3,158,213 | 11/1964 | O'Neill et al. | 175/85 |
| 3,282,357 | 11/1966 | Bunn | 175/122 |
| 3,312,294 | 4/1967 | Wilson | 173/164 |
| 3,722,607 | 3/1973 | Ray | 175/57 |
| 3,766,991 | 10/1973 | Brown | 173/164 |

*Primary Examiner*—Ernest R. Purser
*Attorney, Agent, or Firm*—Seed, Berry, Vernon & Baynam

[57] ABSTRACT

A two-ram hydraulic drilling rig is provided with a lateral support frame. The rams have rods connected through a tension structure with a power swivel. The power swivel has a removable swivel stem assembly for allowing through-swivel positioning of drill pipe, particularly for tripping.

25 Claims, 5 Drawing Figures

HYDRAULIC DRILLING RIG AND POWER SWIVEL

Matter enclosed in heavy brackets [ ] appears in the original patent but forms no part of this reissue specification; matter printed in italics indicates the additions made by reissue.

BACKGROUND OF THE INVENTION

1. Field of the Invention

This invention pertains to hydraulic drilling rigs and to power swivels of the type allowing drill pipe to be passed therethrough.

2. Description of the Prior Art

Various types of hydraulic drilling rigs have been used heretofore, U.S. Pat. Nos. 3,722,607; 3,282,357; 2,502,895 and 3,158,213 are representative of some of these rigs. Most hydraulic drilling rigs have employed more than two rams or cylinders, arranged in an array which makes removal of the drill pipe difficult. The Schaffer patent, U.S. Pat. No. 2,502,895, employs a two-cylinder rig but the rig is not suitable for handling connected, multiple lengths of pipe, such as doubles or triples.

Heretofore, tripping long lengths of pipe has been a time-consuming, costly operation requiring removal of each section of pipe from below the drill stem assembly. Another approach is shown in the Ray patent, U.S. Pat. No. 3,722,607. This patent describes a through-the-power swivel drilling rig which uses slips for gripping the pipe while rotating the pipe. This type of connection to the pipe has not been well received in the industry.

SUMMARY OF THE INVENTION

It is an object of this invention to provide a hydraulic drilling rig employing only two hydraulic rams or cylinders.

It is an object of this invention to provide a hydraulic drilling rig which is readily accessible for changing drill pipe.

These objects are best obtained by providing a pair of hydraulic rams, the rod ends of which mount a tension structure that supports a power swivel centered between the rams. The rams are rigidly connected to a lateral support, leaving open access on one side of the support for changing drill pipe.

It is another object of the invention to provide a power swivel with a removable drill stem assembly for tripping pipe through the power swivel.

The power swivel is of the type which uses a drill stem assembly for threadably connecting to a pipe during drilling and reworking operations. The drill stem assembly can be removed from the drive assembly of the power swivel and replaced by an entry guide, allowing clear passage for passing pipe during tripping operations.

DETAILED DESCRIPTION OF THE PREFERRED EMBODIMENTS

Figure 1A:
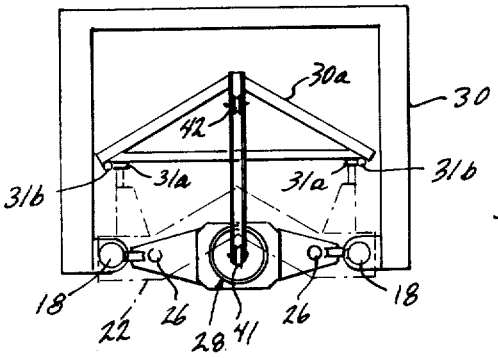
FIG. 1A is a schematic section looking in the direction of the arrows 1A and FIG. 1.
Figure 1:
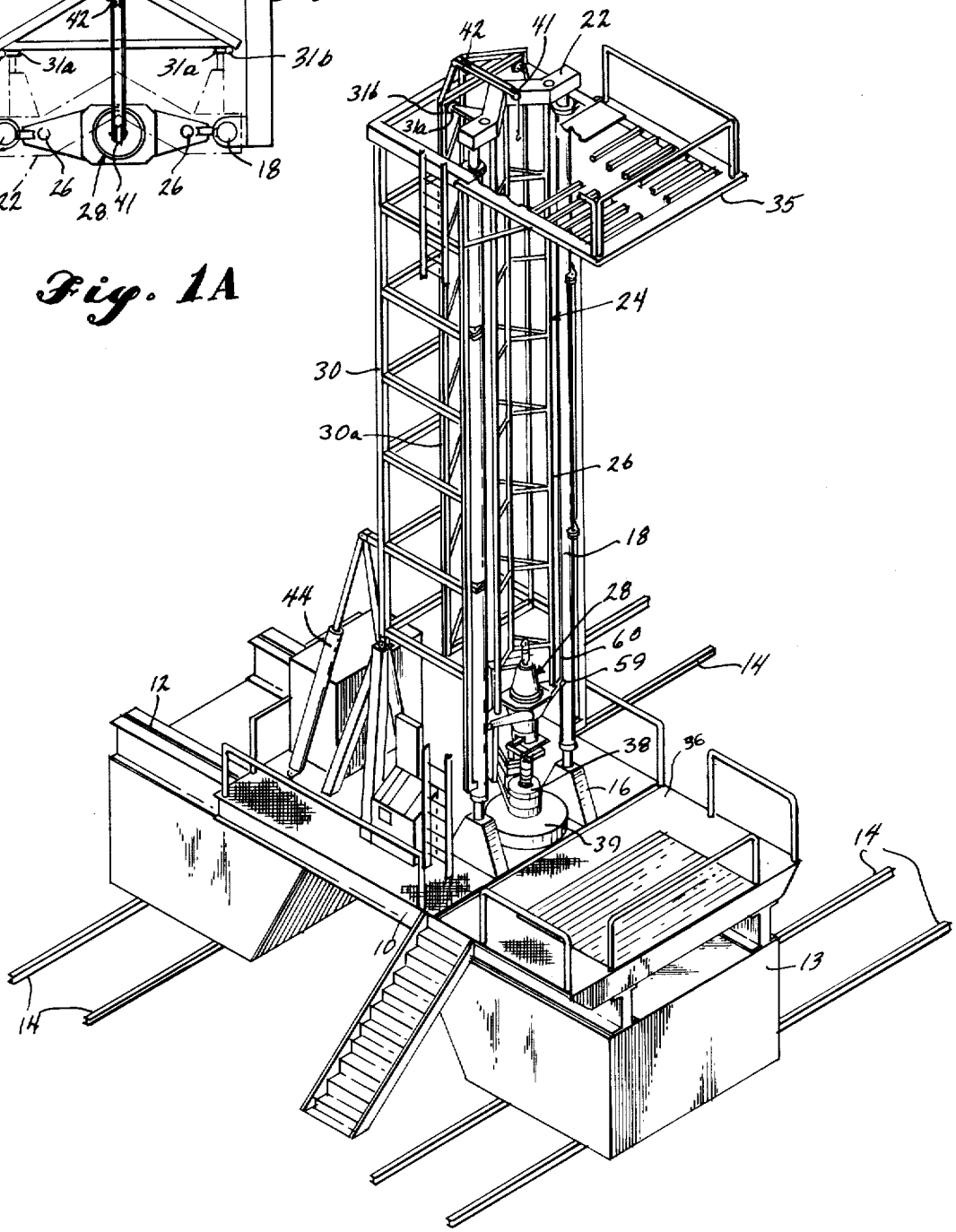
FIG. 1 is an isometric of a hydraulic oil derrick embodying the principles of the invention and with a portion of the support structure in a stowed condition.
Figure 2:
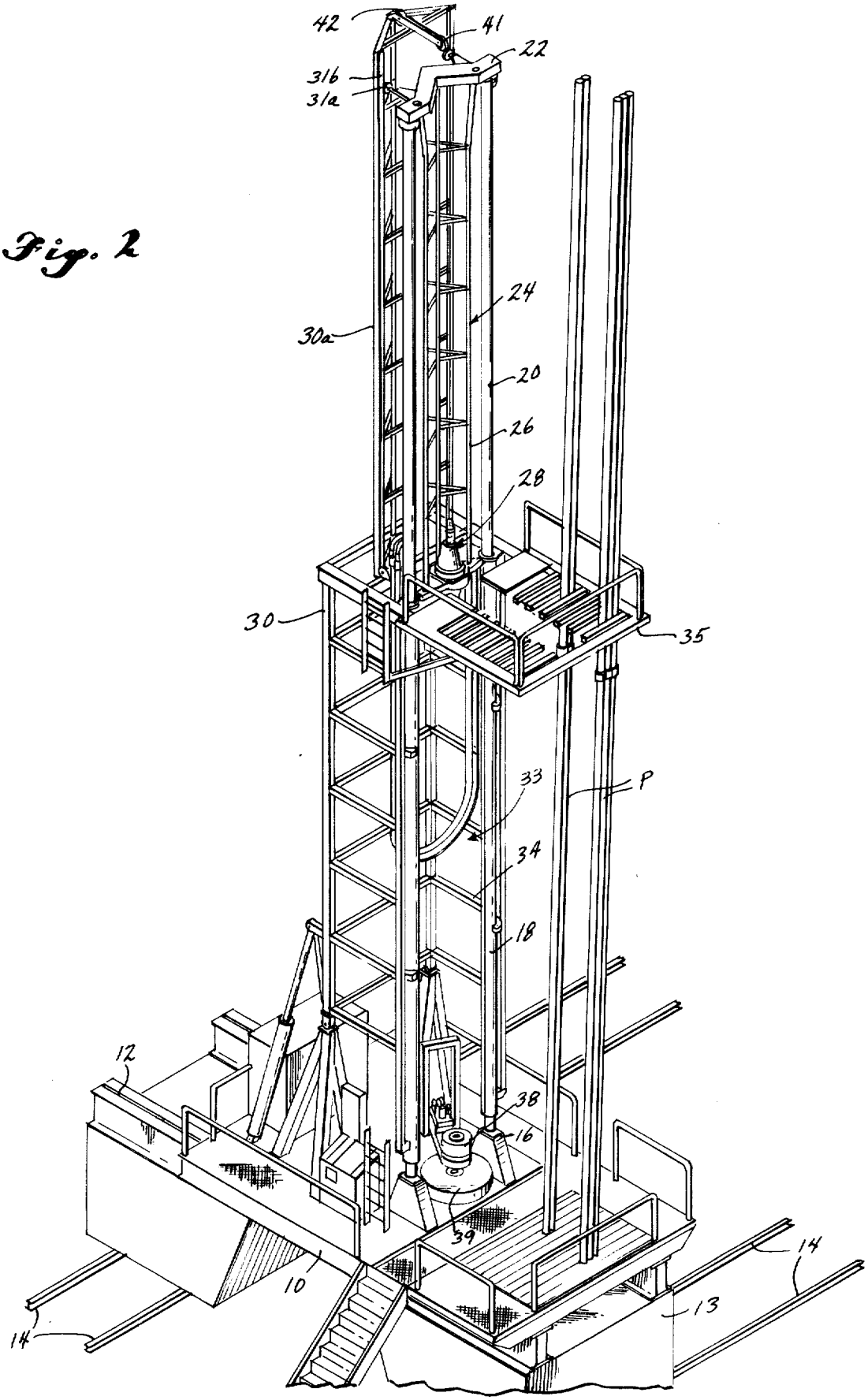
FIG. 2 is an isometric of the oil derrick in an extended position.

As best shown in FIG. 1, the hydraulic rig includes a base 10 mounted on skids 12 for movement in one direction. The skids are, in turn, mounted on a platform 13 which is movable on skids 14 for movement of the derrick in another direction. These movements allow accurate positioning or the derrick over the hole of an existing well for reworking or the like.

The drilling rig also includes a set of cylinder or ram stands 16. A pair of hydraulic rams 18 are removably connected to the stands 16 in any conventional manner, but preferably in the manner described in my copending application, entitled "Multiple-Passage, Quick-Disconnect Coupling," filed concurrently herewith. Preferably, the hydraulic connection between the cylinders and the hydraulic source 18 is through the stands 16; however, conventional hydraulic connections or those similar to that shown in the Bunn patent, U.S. Pat. No. 3,282,352, may be used.

Each cylinder or ram 18 is provided with a body or rod 20. The rods 20 are coupled at their upper ends to a horizontal cross brace 22 which forms a part of a tension structure 24. The tension structure is provided with elongated arms 26 which connect with a power swivel 28.

Lateral support for the hydraulic rams 18 is provided by a main support 30, rectangular in cross-section and having side beams for connecting to the upper ends of the rams and truss members 34 for connecting along the length of the cylinders. The main support 30 is also provided with an extendible support 30a, which is raised initially by the rams 18 and pinned in place during operations of the rig. The cross brace 22 is provided with opposed V-rollers 31a which ride on tracks 31b extending lengthwise on the extendible support. As is best shown in FIG. 1A, the support 30 provides a rigid, lateral support structure for the hydraulic cylinders and tensioning structure but leaves an open forward access 33 for removing and placing drill pipe relative to the power swivel.

Mounted on the ends of the side beams 32 is a conventional pipe storing rack 35 which overlies a set-back area of conventional design. Pipe sections P, preferably doubles, that is, two sections of standard size pipe coupled together, can be stored in the storage rack using the principles of this invention.

On the base 10 of the drilling rig, a conventional power tong 38 is positioned, along with conventional power slips 39. Of course, other necessary wellhead equipment, such as blowout preventers and the like, is also provided, if desired, in a conventional manner.

Mounted on top of the extendible support 30a is a sheave 41 of a conventional auxiliary hoist 42 which uses a conventional single-joint-type elevator.

Figure 3:
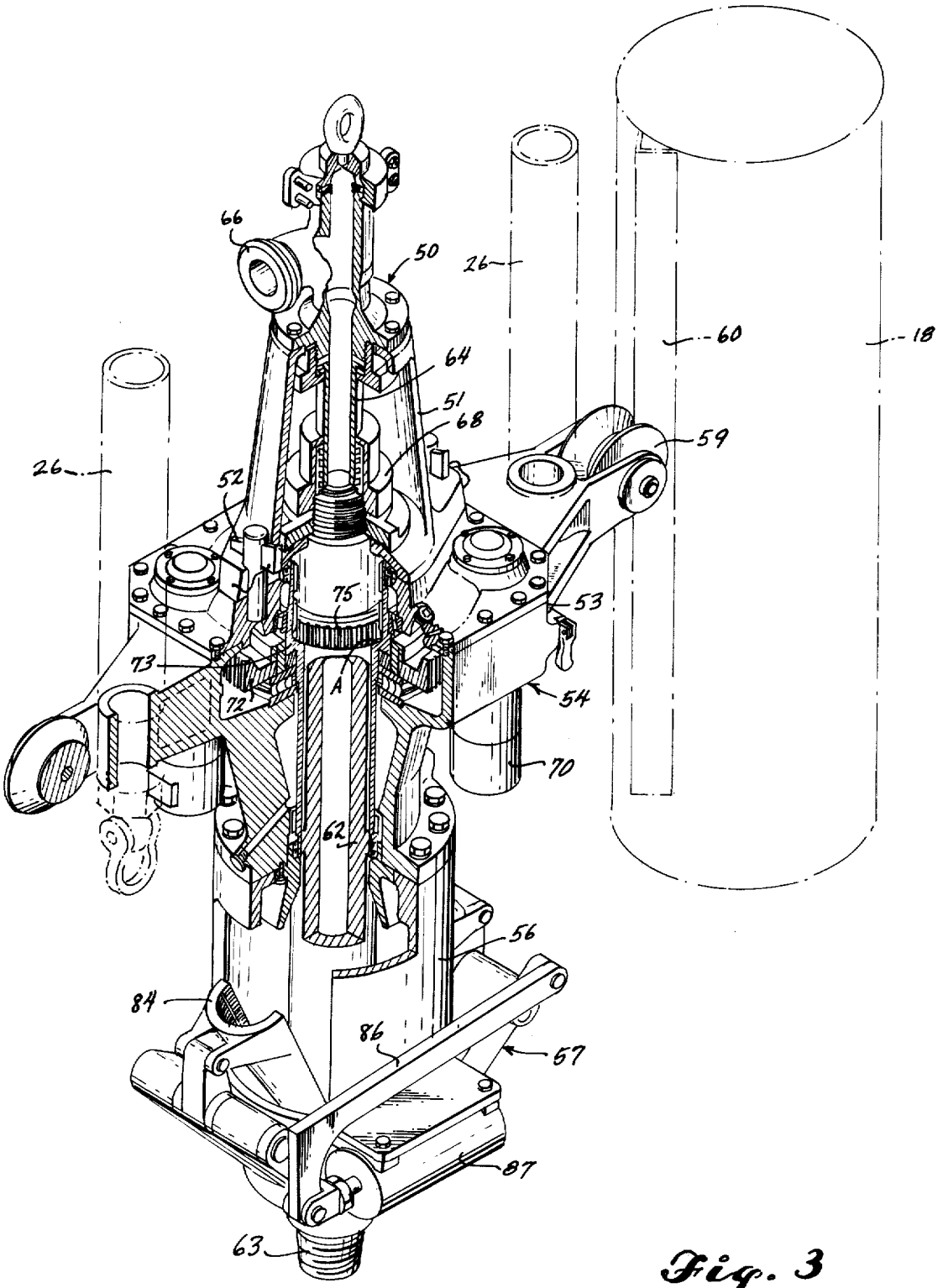
FIG. 3 is an isometric of the power swivel, with parts broken away for clarity.

The power swivel 28 (FIG. 3) includes a swivel stem assembly 50 having an auxiliary housing 51 joined by wedges 52 to a main housing 53 of a rotary drive assembly 54. A lower housing 56, forming part of a slip-type elevator 57, is bolted to the bottom of the main housing. The opposite sides of the main housing are provided with guide rollers 59 that ride on tracks 60 secured to the rams 18.

The swivel stem assembly 50 includes a hollow shaft 62 having a threaded stem or pin 63. The opposite end of the hollow shaft is threadably connected to a conventional rotary sealing box 68 that surrounds a stationary wash pipe 64. The pipe 64 is joined to a hose coupling 66 for drilling fluid.

The rotary drive assembly 54 includes four hydraulic motors 70 driving a ring gear 72 that is joined to an elongated, splined shaft 73. The splined shaft forms a central hollow core 76 which receives the hollow shaft 62. The hollow shaft has vertically shortened splines 75 which allow the shaft to move vertically a limited distance relative to the splines on the shaft 73. The vertical movement allows the stem 63 to be moved up and down when threading or unthreading the drill pipe onto or off of the stem.

Figure 4:
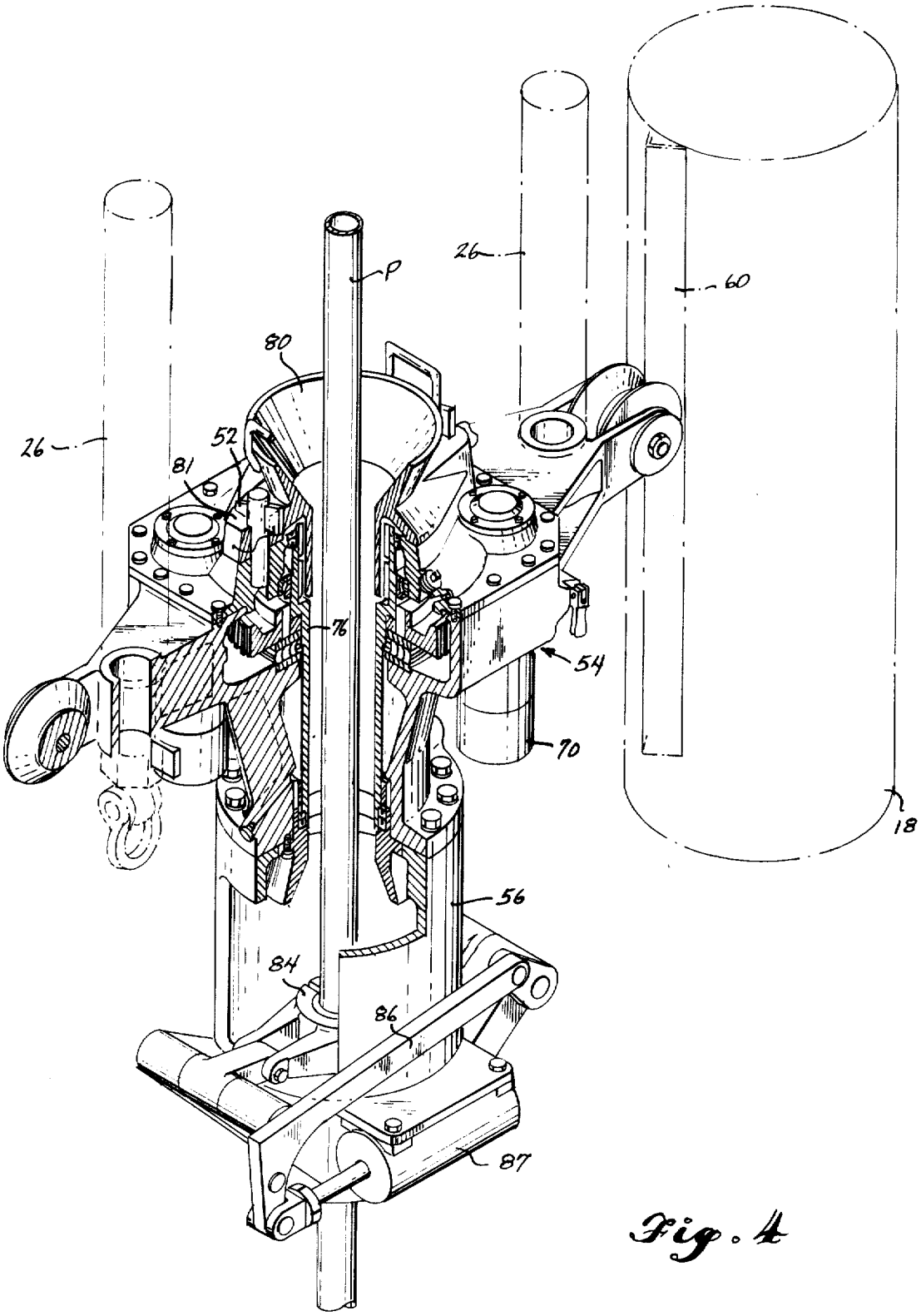
FIG. 4 is another isometric of the power swivel, with parts broken away for clarity and showing an entry guide substituted for the drill stem assembly of FIG. 3.

FIG. 4 shows the same power swivel, with the swivel stem assembly 50 removed and, in its place, an entry guide 80 installed. The guide 80 has a flange 81 which can receive the wedges 52 for locking the entry guide on the housing 53. The hollow core of the rotary drive assembly 54 is of sufficient diameter, with the swivel stem assembly removed, to allow pipe P, including collars or interconnection between sections of the pipe, to pass through the center of the power swivel.

The elevators 57 include slips 84 which are coupled by a linkage 86 to a pneumatic cylinder 87. The slips can be closed on the pipe, as in FIG. 4, or opened, as in FIG. 3.

The drill string is normally suspended from the stem, with the force being transmitted through the shoulder of the underside of the spline 75 to the rotary drive assembly as at A and thus to the tension structure 26. In this condition, the slips 84 will be open and the pipe rotated by the motors 70. To add additional lengths of pipe, the pipe, in single sections, is removed from a separate pipe storage rack by the auxiliary hoist, and, with the power swivel in its uppermost position, the pipe is lowered beneath the stem 63 and the power tongs 38 couple the section to the pipe in the ground. The stem 63 is then brought down and the motors 70 energized to thread the stem onto the pipe. When the pipe is down into the earth as far as it can go, the slips 39 are set and the hydraulic motors 70 are reversed, releasing the pipe from the stem. The power swivel is again raised to receive the next piece of pipe.

In an operation in which only a few pieces of pipe are to be removed, the reverse operation takes place.

When tripping an entire string of pipe, the drill stem assembly 50 is removed by manually knocking out the wedges 52. This is done with just the upper end of the pipe protruding above the power slips 39 and with the stem of the drill stem assembly first being unscrewed from the pipe. After the entry guide 80 is put in place and locked by the wedges 50, the slips 84 are lowered over the end of the pipe and closed on the pipe. The power slips 39 are released and the hydraulic rams energized to raise the power swivel vertically with the drill string. The cylinders have a stroke of approximately thirty-six feet, which is more than the length of the normal pipe section. After the top of the stroke is reached, the power slips 39 are again engaged on the pipe and the elevator slips 84 released so that the power swivel can be lowered down on the pipe. The pipe is again engaged by the elevator slips 84, and the second stroke of the cylinders allows a double pipe to be pulled from the earth. The pipe is manually connected to an elevator on the auxiliary hoist 42 by a workman on the racking platform 35. The power swivel is again lowered, the pipe joint is broken by the power tongs and the auxiliary hoist then lifts the pipe free of the power swivel and carries it over to the rack 35. This operation is repeated until the entire pipe is removed.

Thus, the invention advantageously provides for double stroking to remove double pipe sections. The power swivel allows for very rapid tripping, while still using the preferred conventional type of swivel stem assembly. Since the swivel does not have to be removed, a change-over operation for tripping can be very fast, taking a relatively few minutes. The hollow power swivel allows vertical removal of doubles or even triples without requiring movement of the power swivel away from the well center line. The power swivel can also be used with conventional drill rigs equipped with split traveling blocks and flapper-type elevators. The hollow core again allows tripping without removal of the swivel and provides faster tripping times than presently obtained with prior art systems. As with conventional power swivels, the rotary table and Kelly system may be entirely eliminated, if desired.

While the preferred embodiment of the invention has been illustrated and described, it should be understood that variations will be apparent to one skilled in the art without departing from the principles expressed herein. Accordingly, the invention is not to be limited to the specific embodiment described.

The embodiments of the invention in which a particular property or privilege is claimed are defined as follows:

1. A power swivel for a drilling derrick or the like *having means for lifting and lowering the power swivel*, comprising:

a rotary drive assembly *coupled to said lifting and lowering means for vertically moving the rotary drive assembly*, a removable swivel stem assembly, said swivel stem assembly including a hollow shaft drivingly engaged with said rotary drive assembly and having a lower stem end for threadably engaging a pipe and an upper end, a rotary coupling joined to said upper end for connecting the hollow shaft with a source of fluid; and a pipe-holding assembly for holding a pipe against downward movement relative to said rotary drive assembly *as the rotary drive assembly is moved vertically*, said drive assembly including an outer main housing, said swivel stem assembly including an auxiliary housing, and locking means operatively securing said auxiliary housing to said main housing and providing for quick separation of said swivel stem assembly from said drive assembly.

2. The apparatus of claim 1, said drive assembly including a hollow core for receiving said hollow shaft, and entry guide means adapted for fitting within said hollow core alternatively to said hollow shaft when said swivel stem assembly is removed, said entry guide means including means for receiving said locking means for securing the entry guide means to said main housing.

3. The apparatus of claim 1 wherein said locking means includes wedge means suitable for being released by hammering.

4. A power swivel for a drilling derrick or the like, comprising:

a rotary drive assembly *suspended from the derrick*,

*means for raising and lowering the rotary drive assembly,* a removable swivel stem assembly, said swivel stem assembly including a hollow shaft drivingly engaged with said rotary drive assembly and having a lower stem end for threadably engaging a pipe and an upper end, a rotary coupling joined to said upper end for connecting the hollow shaft with a source of fluid; and a pipe-holding assembly for holding a pipe against downward movement relative to said rotary drive assembly *as said rotary drive assembly is raised and lowered*, said drive assembly including a hollow core for receiving said hollow shaft, entry guide means adapted for fitting within said hollow core alternatively to said hollow shaft when said swivel stem assembly is removed, and means for locking said entry guide means to said drive assembly.

5. A derrick for drilling, reworking or the like, comprising:

pipe racking means, a pair of hydraulic actuators having ends extendible vertically beyond a standard drill pipe length, a rigid tower secured to said actuators rearwardly thereof for providing lateral stability to said actuators while leaving a front access opening, a tension structure joined to said extendible ends and extending downwardly therefrom, a power swivel secured to the lower end of said tension structure, said power swivel having a removable swivel stem assembly whereby pipe can be tripped through the power swivel and carried through said front access opening, elongated vertical track means, means on said power swivel for guidingly engaging said track means for precluding rotation of said power swivel, and auxiliary hoist means for moving pipe through said front access opening.

6. The derrick of claim 5, said rigid tower including an extendible support structure and means for guiding movement of said tension structure along said extendible support structure.

7. The derrick of claim 5, said pipe racking means confronting said front access opening.

8. The derrick of claim 5 wherein said elongated, vertical track means are secured to said actuators.

9. A power swivel for a drilling derrick or the like *having means for raising and lowering the power swivel*, comprising:

a rotary drive assembly having a hollow central passage, said drive assembly including a motor which is vertically movable together with the remainder of the drive assembly, a stem assembly including a hollow shaft seated in said central passage and drivingly engaged with said rotary drive assembly, said hollow shaft having a lower stem end for threadably engaging a pipe and an open upper end, and means joined to said hollow shaft upper end for connecting the hollow shaft with a source of drilling fluid, and wherein said stem assembly is removable as a unit from the power swivel, thereby leaving the hollow central passage in the rotary drive assembly for passing pipe axially through the rotary drive assembly *by moving the power swivel raising and lowering means.*

[10. The power swivel of claim 9, further including pipe-holding means attached for movement with said power swivel for holding a pipe against axial movement relative to said power swivel so that pipe can be held by the pipe-holding means and moved upward with the power swivel, released, and then moved axially downwardly on the pipe with the power swivel for gripping at a lower location on the pipe while the pipe protrudes through the hollow central passage of the rotary drive assembly.]

11. The power swivel of claim 9, said rotary drive assembly including drive means driven by said motor and exposed in said central passage when said hollow shaft is removed, and said hollow shaft circumferential driven means in engagement with said drive means; and entry guide means adapted for fitting within said central passage and extending axially along the passage to overlie said exposed drive means for protecting the latter when pipe is moving through said central passage.

12. In a power swivel assembly for a drilling rig *in which the power swivel assembly is adapted to be raised and lowered* comprising:

a power means having a vertical opening through which drill pipe can be passed while being tripped, said power means including a motor which is vertically movable together with the remainder of the power swivel assembly, rotary power output means adapted to occupy said opening and be driven by said power means and adapted to drivingly connect to a drill pipe depending from its lower end, said output means being removable from said opening when disconnected from the drill pipe, and pipe-holding means operatively associated with said power means for selectively holding drill pipe from lowering when said power output means is disconnected from the pipe *and adapted to hold the pipe in the power means as the power means is raised and lowered.*

13. A power swivel assembly according to claim 12, in which said power output means includes a hollow shaft threaded at its lower end to threadably engage a drill pipe and has a rotary fluid coupling at its upper end.

14. A power swivel according to claim 12, in which removable guide means are provided for fitting into said opening to guide a pipe through when said power output means is removed.

15. The method of moving pipe in an earth-working operation including connecting pipe sections to a power swivel by threadably joining the sections to a rotary driven stem assembly of the power swivel and alternately tripping lengthy, connected pipe sections from the earth, the improvement comprising:

removing the rotary driven stem assembly from the power swivel, leaving a central passage; and moving the pipe and the power swivel axially relative to each other for removal of the pipe from the earth by causing the pipe to move through said central passage.

16. The method of claim 15, said power swivel including elevator slips, said step of moving pipe including gripping the pipe with said elevator slips and raising the power swivel.

17. The method of claim 16, said step of raising the power swivel including alternately gripping and raising and ungripping and lowering the power swivel to raise multiple sections of pipe.

18. The method of claim 15, said step of moving the pipe including gripping the pipe adjacent the ground with stationary grippers, gripping the pipe with vertically movable grippers, releasing the pipe from the stationary grippers adjacent the ground, raising the pipe with the vertically movable grippers, supporting the pipe independently of the movable and stationary grippers, releasing the pipe from the vertically movable grippers, disconnecting a part of the pipe from the pipe in the ground while again gripping the pipe in the ground with the stationary grippers and moving it to a storage area.

19. In a method of drilling and then tripping a drill pipe by use of a vertically movable power swivel unit containing a motor which moves in its entirety vertically with the rest of the power swivel unit and also containing a removable rotary power output component, the steps of connecting the power output component to a drill pipe, drilling by driving the power output component with the motor to turn the pipe and gradually advancing the turning pipe by moving the power swivel unit downwardly, ceasing drilling and holding the drill pipe against downward movement independently of the power output component, disconnecting the power output component from the pipe and removing said component from the power swivel unit such as to leave an opening through the remainder of the power swivel unit aligned with the pipe, moving the pipe and said remainder of the power swivel unit such as to move the pipe endwise through said opening and locate part of the pipe above the power swivel unit, and removing a portion of the pipe located above the power swivel unit.

20. The method according to claim 19, in which said holding of the drill pipe against downward movement is performed by an elevator carried by the power swivel unit.

21. The method according to claim 20, in which said moving of the pipe and said remainder of the power swivel unit is performed by;

raising the power swivel unit to thereby raise the pipe by said elevator, gripping the pipe independently of said elevator at a location spaced below the raised power swivel and releasing the pipe from the elevator, and lowering the power swivel unit with the gripped pipe passing through said opening of the pipe above the power swivel unit to locate part of the pipe above the power swivel unit.

22. The method according to claim 19, in which a pipe guide is inserted in said opening when the power output component is removed and said pipe passes through said guide when moving endwise through said opening.

23. In a method of tripping a drill pipe after a vertically movable power swivel unit containing a motor entirely vertically movable with said unit is used to turn the pipe during drilling by action of a power output component of the power swivel unit which is detachably connected to the pipe and is driven within the power swivel unit by the motor, disconnecting the power output component from the pipe and removing it from the power swivel unit such as to leave a vertical opening which passes completely through the remainder of the vertically movable power swivel unit and is aligned with the pipe, and raising the pipe and moving the pipe and said remainder of the power swivel unit relative to one another such as to move the pipe through said opening.

24. In a method of tripping sections of a drill pipe from a drill hole after a power swivel unit containing a motor is used during drilling to turn the pipe by action of a power output component of the power swivel unit which is detachably connected to the pipe and is driven by the motor while the entire power swivel unit is gradually moved downwardly to advance the turning pipe, disconnecting the power output component from the pipe and removing it from the power swivel unit such as to leave an opening through the remainder of the power swivel unit aligned with the pipe, raising the pipe and power swivel unit, lowering the power swivel unit relative to the pipe with the pipe passing through said opening to locate at least one section of the pipe above the power swivel unit, and removing a section of pipe located above the power swivel unit.

25. In a method of tripping sections of drill pipe from a drill hole after a vertically movable power swivel unit containing a motor and carrying an elevator is used during drilling to turn the pipe by action of a power output component of the power swivel unit which is detachably connected to the pipe and is driven within the power swivel unit by the motor, the steps of disconnecting the power output component from the pipe and removing it from the power swivel unit such as to leave an opening through the remainder of the power swivel unit aligned with the pipe, holding the top of the pipe aligned with said opening with said elevator and raising the power swivel unit to responsively raise the pipe by the elevator, gripping the pipe independently of said elevator in alignment with said opening, lowering the power swivel unit and elevator relative to the gripped pipe with the pipe passing through said opening to locate at least one section of the pipe above the power swivel unit, and removing a section of pipe located above the power swivel unit.

*26. A power swivel for a drilling derrick or the like having means for raising and lowering the power swivel comprising:*

*a rotary drive assembly having a hollow central passage, said drive assembly including a motor which is vertically movable together with the remainder of the drive assembly,*

*a stem assembly including a hollow shaft seated in said central passage and drivingly engaged with said rotary drive assembly, said hollow shaft having a lower stem end for threadably engaging a pipe and an open upper end, and*

*means joined to said hollow shaft upper end for connecting the hollow shaft with a source of drilling fluid, and wherein said stem assembly is removable as a unit from the power swivel, thereby leaving the hollow central passage in the rotary drive assembly for passing pipe axially through the rotary drive assembly by moving the power swivel raising and lowering means, further including pipe-holding means attached for movement with said power swivel for holding a pipe against axial movement relative to said power swivel so that pipe can be held by the pipe-holding means and moved axially downwardly on the pipe with the power swivel for gripping at a lower location on the pipe while the pipe protrudes through a hollow central passage of the rotary drive assembly.*

* * * * *